(12) United States Patent
Yablonowski et al.

(10) Patent No.: US 6,535,859 B1
(45) Date of Patent: Mar. 18, 2003

(54) SYSTEM AND METHOD FOR MONITORING LIGHTING SYSTEMS

(75) Inventors: Timothy M. Yablonowski, Naples, FL (US); Joseph C. Notarianni, Naples, FL (US); Clarence W. Russell, Ft. Myers, FL (US); Orlando M. Riera, Ft. Myers, FL (US)

(73) Assignee: Ultrawatt Energy System, INC, Ft. Meyers, FL (US)

( * ) Notice: Subject to any disclaimer, the term of this patent is extended or adjusted under 35 U.S.C. 154(b) by 0 days.

(21) Appl. No.: 09/454,775

(22) Filed: Dec. 3, 1999

(51) Int. Cl.[7] .............................................. G06F 17/00
(52) U.S. Cl. ............................ 705/412; 705/14; 702/62
(58) Field of Search ........................... 705/14, 30, 34, 705/412; 702/57, 58, 60–62; 340/870.01, 870.02, 870.05, 870.06

(56) References Cited

U.S. PATENT DOCUMENTS

| 4,333,119 A | | 6/1982 | Schoenmeyr |
| 4,710,751 A | | 12/1987 | Webster |
| 5,301,122 A | | 4/1994 | Halpern |
| 5,583,423 A | | 12/1996 | Bangerter |
| 5,621,654 A | | 4/1997 | Cohen et al. |
| 5,699,276 A | * | 12/1997 | Roos .......................... 702/62 |
| 5,754,036 A | | 5/1998 | Walker |
| 6,088,688 A | * | 7/2000 | Crooks et al. ................ 702/61 |
| 6,169,979 B1 | * | 1/2001 | Johnson ....................... 705/30 |
| 6,262,672 B1 | * | 7/2001 | Brooksby et al. ....... 340/870.05 |
| 6,327,541 B1 | * | 12/2001 | Pitchford et al. ............ 702/62 |

FOREIGN PATENT DOCUMENTS

GB          2107093       *   4/1983

OTHER PUBLICATIONS

*Energy User News* article "Harnessing Energy Information" (v. 24, n. 6), dated Jun. 1999.*

* cited by examiner

*Primary Examiner*—Dean J. Kramer
(74) *Attorney, Agent, or Firm*—Brinks Hofer Gilson & Lione

(57) ABSTRACT

A method and system for charging a fee to an end user where a service company services a lighting system of the end user's facility. To determine the fee, an original power consumption of the facility is determined before the lighting system is retrofitted with at least one power savings device. Thereafter, the lighting system is retro-fitted with the at least one power saving device. Then, a new power consumption is measured of the facility. Finally, the fee is charged to the end user, such that the fee is a function of a difference between the original power consumption and the new power consumption.

18 Claims, 18 Drawing Sheets

ULTRAWATT® ENERGY SAVINGS REPORT
(FOR UIS INTERNAL USE ONLY)
(USE 1 REPORT FOR EACH LIGHTING PANEL)

CUSTOMER (END USER): _____

FACILITY: _____

CONTACT PERSON: _____

ADDRESS: _____

_____

DATE: _____ PANEL: _____

ULTRAWATT INSTALLER:

_____
COMPANY NAME
_____
CONTACT PERSON
_____
TELEPHONE #

ULTRAWATT® CERTIFICATION PROVIDED BY:

_____
COMPANY (ENGINEERING FIRM)
_____
CONTACT PERSON
_____
TELEPHONE #

_____
DATE

FIG. 6A

PART-1
PAGE 1

SAVINGS MODE: OFF
BEFORE COMBINING CIRCUITS

PANEL FEEDER READINGS

PANEL # _____

| PHASE | AMPS | THD | KW | PF |
|---|---|---|---|---|
| A | _____ | _____ | _____ | _____ |
| B | _____ | _____ | _____ | _____ |
| C | _____ | _____ | _____ | _____ |
| TOTAL | _____ | | _____ | |
| NEUTRAL | _____ | _____ | | |

SINGAL NEUTRALS

AMPS

| | | | | |
|---|---|---|---|---|
| *1 | _____ — | | 17 | _____ — |
| 2 | _____ — | | 18 | _____ — |
| 3 | _____ — | | 19 | _____ — |
| 4 | _____ — | | 20 | _____ — |
| 5 | _____ — | | 21 | _____ — |
| 6 | _____ — | | 22 | _____ — |
| 7 | _____ — | | 23 | _____ — |
| 8 | _____ — | | 24 | _____ — |
| 9 | _____ — | | 25 | _____ — |
| 10 | _____ — | | 26 | _____ — |
| 11 | _____ — | | 27 | _____ — |
| 12 | _____ — | | 28 | _____ — |
| 13 | _____ — | | 29 | _____ — |
| 14 | _____ — | | 30 | _____ — |
| 15 | _____ — | | 31 | _____ — |
| 16 | _____ — | | 32 | _____ — |

*NUMBERS DO NOT RELATE TO CIRCUIT BREAKER NUMBERS

FIG. 6B

PART 1
PAGE 2

SAVINGS MODE: OFF
BEFORE COMBINING CIRCUITS

SURVEY DATA SHEET           TESTED BY: _____

FACILITY NAME/STORE #: _____  DATE: _____

PANEL INSTALLATION LOCATION: _____

MEASUREMENTS:

|  | CIRCUIT # ___ PHASE ___ | CIRCUIT # ___ PHASE ___ | CIRCUIT # ___ PHASE ___ | CIRCUIT # ___ PHASE ___ |
|---|---|---|---|---|
| RMS LINE VOLTAGE | ___ | ___ | ___ | ___ |
| RMS LOAD AMPS | ___ | ___ | ___ | ___ |
| LOAD KW | ___ | ___ | ___ | ___ |
| FLUOR. (EACH) FIXT. WATTS | ___ | ___ | ___ | ___ |
| HID (EACH) FIXT. WATTS | ___ | ___ | ___ | ___ |

|  | CIRCUIT # ___ PHASE ___ | CIRCUIT # ___ PHASE ___ | CIRCUIT # ___ PHASE ___ | CIRCUIT # ___ PHASE ___ |
|---|---|---|---|---|
| RMS LINE VOLTAGE | ___ | ___ | ___ | ___ |
| RMS LOAD AMPS | ___ | ___ | ___ | ___ |
| LOAD KW | ___ | ___ | ___ | ___ |
| FLUOR. (EACH) FIXT. WATTS | ___ | ___ | ___ | ___ |
| HID (EACH) FIXT. WATTS | ___ | ___ | ___ | ___ |

|  | CIRCUIT # ___ PHASE ___ | CIRCUIT # ___ PHASE ___ | CIRCUIT # ___ PHASE ___ | CIRCUIT # ___ PHASE ___ |
|---|---|---|---|---|
| RMS LINE VOLTAGE | ___ | ___ | ___ | ___ |
| RMS LOAD AMPS | ___ | ___ | ___ | ___ |
| LOAD KW | ___ | ___ | ___ | ___ |
| FLUOR. (EACH) FIXT. WATTS | ___ | ___ | ___ | ___ |
| HID (EACH) FIXT. WATTS | ___ | ___ | ___ | ___ |

TEST COMMENTS: _____

NOTE: MEASURE THE PHASE ANGLE AT EACH CIRCUIT AND VERIFY THAT THE CIRCUIT DOES NOT HAVE HIGHER THAN -6 DEGREES FOR FLOURESCENT AND -17 DEGREES FOR HID. IF THE CIRCUIT SHOWS GREATER THAN THE SPECIFIED GUIDELINE, CHECK THE CIRCUIT FOR INCORRECT BALLAST/LAMP TYPE OR A NON LIGHTING PIECE OF EQUIPMENT.

FIG. 6C

PART -1
PAGE 3

SAVINGS MODE: OFF
COMBINATION PAGE

SURVEY DATA SHEET          TESTED BY: _____

DATE: _____
FACILITY NAME/STORE #:     _____

PANEL INSTALLATION LOCATION: _____

COMBINATIONS:

| CKT. # | EXISTING CIRCUITS AMPS | NEW CIRCUIT#___ TOTAL AMPS | CKT. # | EXISTING CIRCUITS AMPS | NEW CIRCUIT#___ TOTAL AMPS | CKT. # | EXISTING CIRCUITS AMPS | NEW CIRCUIT#___ TOTAL AMPS |
|---|---|---|---|---|---|---|---|---|
| ___ ___ ___ | ___ ___ ___ | _____ | ___ ___ ___ | ___ ___ ___ | _____ | ___ ___ ___ | ___ ___ ___ | _____ |
| CKT. # | EXISTING CIRCUITS AMPS | NEW CIRCUIT#___ TOTAL AMPS | CKT. # | EXISTING CIRCUITS AMPS | NEW CIRCUIT#___ TOTAL AMPS | CKT. # | EXISTING CIRCUITS AMPS | NEW CIRCUIT#___ TOTAL AMPS |
| ___ ___ ___ | ___ ___ ___ | _____ | ___ ___ ___ | ___ ___ ___ | _____ | ___ ___ ___ | ___ ___ ___ | _____ |
| CKT. # | EXISTING CIRCUITS AMPS | NEW CIRCUIT#___ TOTAL AMPS | CKT. # | EXISTING CIRCUITS AMPS | NEW CIRCUIT#___ TOTAL AMPS | CKT. # | EXISTING CIRCUITS AMPS | NEW CIRCUIT#___ TOTAL AMPS |
| ___ ___ ___ | ___ ___ ___ | _____ | ___ ___ ___ | ___ ___ ___ | _____ | ___ ___ ___ | ___ ___ ___ | _____ |
| CKT. # | EXISTING CIRCUITS AMPS | NEW CIRCUIT#___ TOTAL AMPS | CKT. # | EXISTING CIRCUITS AMPS | NEW CIRCUIT#___ TOTAL AMPS | CKT. # | EXISTING CIRCUITS AMPS | NEW CIRCUIT#___ TOTAL AMPS |
| ___ ___ ___ | ___ ___ ___ | _____ | ___ ___ ___ | ___ ___ ___ | _____ | ___ ___ ___ | ___ ___ ___ | _____ |

FIG. 6D

PART -2
PAGE 4

SAVINGS MODE: OFF
AFTER COMBINING CIRCUITS

SURVEY DATA SHEET                            TESTED BY: _____

FACILITY NAME/STORE #: _____    DATE: _____

PANEL INSTALLATION LOCATION: _____

MEASUREMENTS:

|  | CIRCUIT # ___ PHASE ___ | CIRCUIT # ___ PHASE ___ | CIRCUIT # ___ PHASE ___ | CIRCUIT # ___ PHASE ___ |
|---|---|---|---|---|
| RMS LINE VOLTAGE | ___ | ___ | ___ | ___ |
| RMS LOAD AMPS | ___ | ___ | ___ | ___ |
| LOAD KW | ___ | ___ | ___ | ___ |
| FLUOR. (EACH) FIXT. WATTS | ___ | ___ | ___ | ___ |
| HID (EACH) FIXT. WATTS | ___ | ___ | ___ | ___ |

|  | CIRCUIT # ___ PHASE ___ | CIRCUIT # ___ PHASE ___ | CIRCUIT # ___ PHASE ___ | CIRCUIT # ___ PHASE ___ |
|---|---|---|---|---|
| RMS LINE VOLTAGE | ___ | ___ | ___ | ___ |
| RMS LOAD AMPS | ___ | ___ | ___ | ___ |
| LOAD KW | ___ | ___ | ___ | ___ |
| FLUOR. (EACH) FIXT. WATTS | ___ | ___ | ___ | ___ |
| HID (EACH) FIXT. WATTS | ___ | ___ | ___ | ___ |

|  | CIRCUIT # ___ PHASE ___ | CIRCUIT # ___ PHASE ___ | CIRCUIT # ___ PHASE ___ | CIRCUIT # ___ PHASE ___ |
|---|---|---|---|---|
| RMS LINE VOLTAGE | ___ | ___ | ___ | ___ |
| RMS LOAD AMPS | ___ | ___ | ___ | ___ |
| LOAD KW | ___ | ___ | ___ | ___ |
| FLUOR. (EACH) FIXT. WATTS | ___ | ___ | ___ | ___ |
| HID (EACH) FIXT. WATTS | ___ | ___ | ___ | ___ |

TEST COMMENTS: _____

NOTE: MEASURE THE PHASE ANGLE AT EACH CIRCUIT AND VERIFY THAT THE CIRCUIT DOES NOT HAVE HIGHER THAN -6 DEGREES FOR FLOURESCENT AND -17 DEGREES FOR HID. IF THE CIRCUIT SHOWS GREATER THAN THE SPECIFIED GUIDELINE, CHECK THE CIRCUIT FOR INCORRECT BALLAST/LAMP TYPE OR A NON LIGHTING PIECE OF EQUIPMENT.

FIG. 6E

PART -2
PAGE 5

SAVINGS MODE: OFF
AFTER COMBINING CIRCUITS

TIME OF DAY: _____

PANEL FEEDER READINGS

|  | AMPS | THD | KW | PF | -LAG/+LEAD |
|---|---|---|---|---|---|
| PHASE A | _____ | _____ | _____ | _____ | _____ |
| B | _____ | _____ | _____ | _____ | _____ |
| C | _____ | _____ | _____ | _____ | _____ |
| TOTAL |  |  | _____ |  |  |
| NEUTRAL | _____ | _____ |  |  |  |

SINGAL NEUTRALS

AMPS

| *1 | _____ | — | 17 | _____ | — |
|---|---|---|---|---|---|
| 2 | _____ | — | 18 | _____ | — |
| 3 | _____ | — | 19 | _____ | — |
| 4 | _____ | — | 20 | _____ | — |
| 5 | _____ | — | 21 | _____ | — |
| 6 | _____ | — | 22 | _____ | — |
| 7 | _____ | — | 23 | _____ | — |
| 8 | _____ | — | 24 | _____ | — |
| 9 | _____ | — | 25 | _____ | — |
| 10 | _____ | — | 26 | _____ | — |
| 11 | _____ | — | 27 | _____ | — |
| 12 | _____ | — | 28 | _____ | — |
| 13 | _____ | — | 29 | _____ | — |
| 14 | _____ | — | 30 | _____ | — |
| 15 | _____ | — | 31 | _____ | — |
| 16 | _____ | — | 32 | _____ | — |

*NUMBERS DO NOT RELATE TO CIRCUIT BREAKER NUMBERS

FIG. 6F

PART-3
PAGE 6

SAVINGS MODE: ON
AFTER COMBINING CIRCUITS

SURVEY DATA SHEET          TESTED BY: _____

FACILITY NAME/STORE #: _____          DATE: _____

PANEL INSTALLATION LOCATION: _____

MEASUREMENTS:

|  | CIRCUIT # ___<br>PHASE ___ | CIRCUIT # ___<br>PHASE ___ | CIRCUIT # ___<br>PHASE ___ | CIRCUIT # ___<br>PHASE ___ |
|---|---|---|---|---|
| RMS LINE VOLTAGE | _____ | _____ | _____ | _____ |
| RMS LOAD AMPS | _____ | _____ | _____ | _____ |
| LOAD KW | _____ | _____ | _____ | _____ |
| FLUOR. (EACH) FIXT. WATTS | _____ | _____ | _____ | _____ |
| HID (EACH) FIXT. WATTS | _____ | _____ | _____ | _____ |
|  | CIRCUIT # ___<br>PHASE ___ | CIRCUIT # ___<br>PHASE ___ | CIRCUIT # ___<br>PHASE ___ | CIRCUIT # ___<br>PHASE ___ |
| RMS LINE VOLTAGE | _____ | _____ | _____ | _____ |
| RMS LOAD AMPS | _____ | _____ | _____ | _____ |
| LOAD KW | _____ | _____ | _____ | _____ |
| FLUOR. (EACH) FIXT. WATTS | _____ | _____ | _____ | _____ |
| HID (EACH) FIXT. WATTS | _____ | _____ | _____ | _____ |
|  | CIRCUIT # ___<br>PHASE ___ | CIRCUIT # ___<br>PHASE ___ | CIRCUIT # ___<br>PHASE ___ | CIRCUIT # ___<br>PHASE ___ |
| RMS LINE VOLTAGE | _____ | _____ | _____ | _____ |
| RMS LOAD AMPS | _____ | _____ | _____ | _____ |
| LOAD KW | _____ | _____ | _____ | _____ |
| FLUOR. (EACH) FIXT. WATTS | _____ | _____ | _____ | _____ |
| HID (EACH) FIXT. WATTS | _____ | _____ | _____ | _____ |

TEST COMMENTS: _____

NOTE: MEASURE THE PHASE ANGLE AT EACH CIRCUIT AND VERIFY THAT THE CIRCUIT DOES NOT HAVE HIGHER THAN -6 DEGREES FOR FLOURESCENT AND -17 DEGREES FOR HID. IF THE CIRCUIT SHOWS GREATER THAN THE SPECIFIED GUIDELINE, CHECK THE CIRCUIT FOR INCORRECT BALLAST/LAMP TYPE OR A NON LIGHTING PIECE OF EQUIPMENT.

FIG. 6G

PART-3
PAGE 7

SAVINGS MODE: ON

TIME OF DAY: _____

PANEL FEEDER READINGS

|  | AMPS | THD | KW | PF | -LAG/+LEAD |
|---|---|---|---|---|---|
| PHASE A | _____ | _____ | _____ | _____ | _____ |
| B | _____ | _____ | _____ | _____ | _____ |
| C | _____ | _____ | _____ | _____ | _____ |
| TOTAL |  |  | _____ |  |  |
| NEUTRAL | _____ | _____ |  |  |  |

FIG. 6H

PART-3
PAGE 9

MUST BE LEFT INSIDE OF THE PANEL BOX AT THE INSTALLATION SITE.
FINAL CIRCUIT COMBINATION DATA

PANEL _____

| LCU MODEL & SERIAL # | BREAKER NO | COMBINED CIRCUIT NOS. |
|---|---|---|
| | | |

FIG. 6I

SYSTEM AND METHOD FOR MONITORING LIGHTING SYSTEMS

FIELD OF THE INVENTION

The present invention generally relates to electrical lighting systems. More particularly, the present invention relates to systems and methods for maintaining the lighting systems and for monitoring energy consumption of the lighting systems.

BACKGROUND

Energy consumption in the United States has grown in alarming proportions. One concern is that indiscriminate use of energy and other resources will leave the environment and those that live in it wanting. That concern has existed at least since the oil crisis of the 1970's, and since then American consumers and businesses have focused their attention to the current usage and future supply of energy. The government increased its demand for energy efficient systems when, in the late 1980's and early 1990's, the Department of Energy and the Public Utility Commission provided a financial incentive for utilities to offer Demand Side Measures (DSM) to their customers. End customers took advantage of DSM in the form of utility funded rebates used to purchase more energy efficient motors, variable frequency drives, lighting systems, and occupancy sensors. Despite the prevalence of DSM programs offered by local utilities, however, not all building managers were aware of the programs, and a small percentage of all buildings participated.

To encourage the nation's top corporations to upgrade their facility floor space to more energy efficient lighting, the United States Environmental Protection Agency launched the Green Lights initiative in 1991. Even with the Green Lights initiative, by the end of 1996 only a small percentage of pledged space for lighting retrofit had been upgraded with new lighting technologies. Further initiatives include the Energy Policy Act (EPACT 1992), the President's Climate Change Initiative (1993) and an Executive Order on Energy Efficiency in Federal Facilities by the year 2005. Increased market demand for energy efficient lighting products has also been stimulated by performance based contracting programs offered by energy service companies.

Accordingly, there is a need for improved facility lighting systems. The method and systems should provide an incentive for facility owners to use the improved lighting systems. Thus, the method and system of the preferred embodiments may provide for energy monitoring and maintenance of lighting systems at reduced costs to the facility owner.

BRIEF SUMMARY

The present invention is defined by the following claims, and nothing in this section should be taken as a limitation on those claims. By way of introduction, the preferred embodiment described below includes a method and system for servicing, monitoring and maintaining lighting systems.

A first aspect is described for charging a fee to an end user where a service company upgrades and services a lighting system of the end user's facility. To determine the fee, an original power consumption of the facility is determined before the lighting system is retrofitted with at least one power savings device. Thereafter, the lighting system is retrofitted with the at least one power saving device. Then, a new power consumption value is measured. Finally, the fee is charged to the end user, such that the fee is a function of a difference between the original power consumption and the new power consumption.

A second aspect is described for monitoring energy consumption of a lighting system. Power consumption of the lighting system is controlled with a lighting control unit connected with the lighting system. The lighting control unit collects power consumption data and transfers the power consumption data via a data transfer line to a control center. The power consumption data is received at a server located at the control center. The received power consumption data may then be used to calculate the fee charged to the customer.

A third aspect is described for maintaining a lighting system which includes lighting circuitry. At least one monitor monitors the lighting circuitry of at least one customer and produces at least one alarm signal as a function of the occurrence of a system fault. A data transfer line transfers the alarm signal to a control center. A server receives the alarm signal at the control center, and at least one operator coordinates service to the lighting circuitry when the alarm signal indicates that a fault exists with the lighting system.

BRIEF DESCRIPTION OF THE DRAWINGS

Other features and advantages of the invention will be apparent to those skilled in the art with reference to the detailed description and the drawings, of which:

FIGS. 6A–6F show one preferred embodiment of exemplary lighting system audit sheets for use before the lighting system is operated in a power savings mode;

FIGS. 6G–6I show one preferred embodiment of exemplary lighting system audit sheets for use after the lighting system is operated in a power savings mode.

TABLE OF ACRONYMS

The following table aids the reader in determining the meaning of the several acronyms used to describe the embodiments:

C/T=current transformer.
HID=high intensity discharge.
I/O=input/output.
ISDN=integrated services digital network.
ISP=internet service provider.
Kwh=kilowatt hours.
LCU=lighting control unit.
PC=personal computer.
THD=total harmonic distortion.
UPS=uninterrupted power source.

DETAILED DESCRIPTION OF THE PRESENTLY PREFERRED EMBODIMENTS

To preserve the environment by reducing energy consumption, the below described embodiments utilize 1) a lighting monitoring system and method, 2) a service program system and method, and 3) a lighting maintenance system and method for energy consuming facilities. As used herein, facilities include office buildings, warehouse buildings, banks, schools, federal and state buildings, private residences, and others. The three aspects of the preferred embodiments may be used separately or together.

Figure 1:
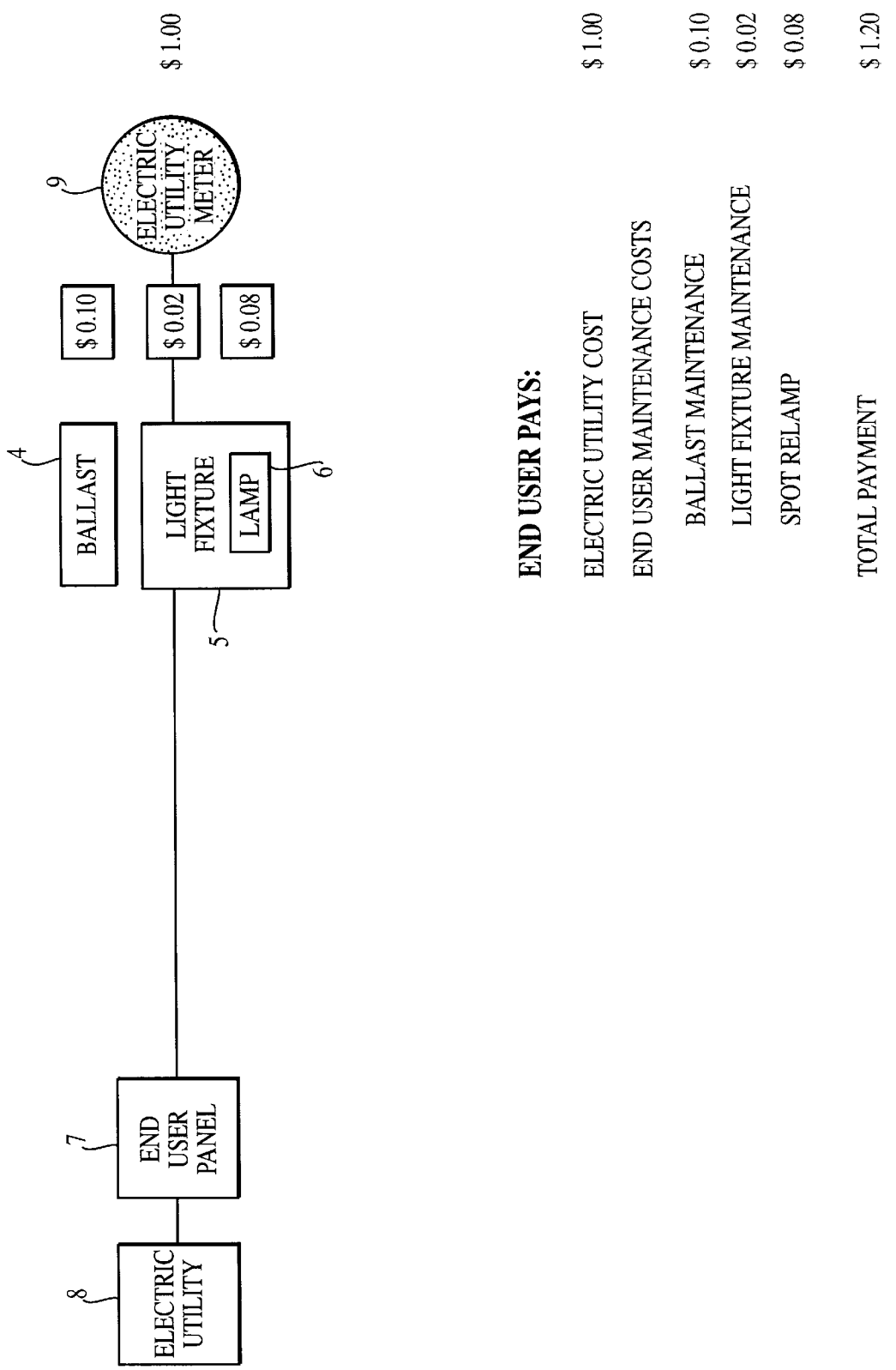
FIG. 1 is a block diagram showing one embodiment of exemplary costs to a facility before utilization of the service program.

Referring to the drawings, and particularly FIG. 1, a typical lighting system includes at least one ballast 4 and lighting fixture 5. The lighting fixture 5 includes a lamp 6, powered from an end user panel 7 which connects with an electric utility 8. The electric utility 8 uses, for example, an electric utility meter 9 to monitor the end user's power consumption to determine an amount the end user should be charged.

Figure 2:
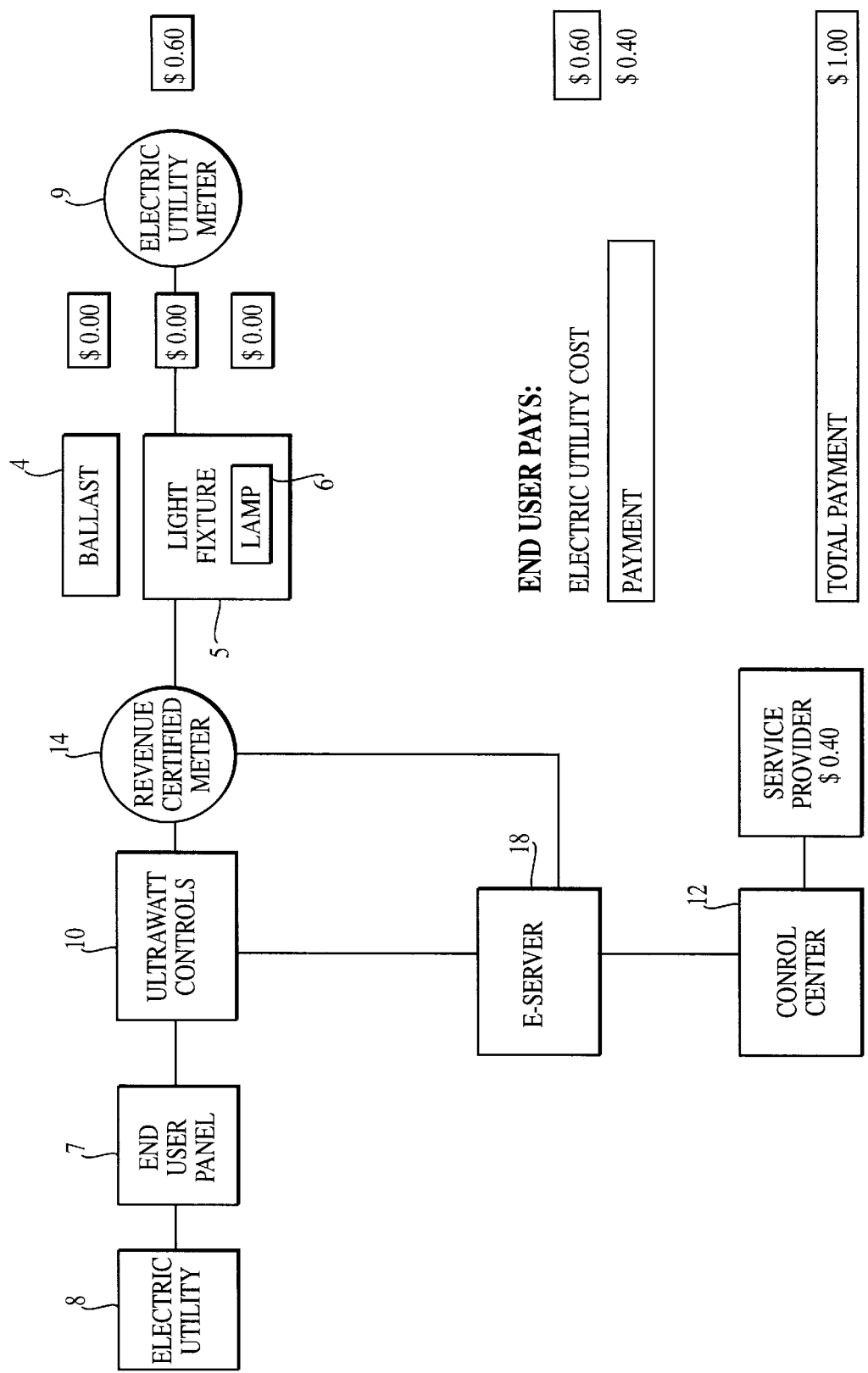
FIG. 2 is a block diagram showing one preferred embodiment of exemplary costs to a facility after utilization of the service program.

Referring now to FIG. 2, the lighting system is modified according to the preferred embodiments to include a lighting control unit (LCU) 10. A preferred LCU is an ULTRAWATT power savings unit as described in commonly owned patents to Walker, U.S. Pat. No. 5,754,036 and Bangerter U.S. Pat. No. 5,583,423, the disclosures of which are incorporated herein by reference. Those skilled in the art will appreciate that other equipment light produces energy reduction may be used, such as other electronically controlled power reduction devices, transformers, switch based power reducers or dimmer switches. Of course, with dimmer switches, unlike with the ULTRAWATT power savings unit, high lighting quality may not be maintained.

The preferred LCU is utilized to regulate alternating current (AC) power to a wide range of complex capacitive and inductive loads to provide reduction in power consumption and may also provide a leading or lagging power factor. The LCU is adjustable for a wide range of loads and may reduce power consumption by 25 percent or more in lighting loads while producing minimal reduction in light output. Alternatively, the LCU implements a predetermined energy reduction. The LCU uses a main switch which is initially turned off slightly in advance of the load current zero crossing. The turn-off time is advanced gradually to reduce power to a target level, and optionally a load phase angle is measured and maintained to control the power savings ratio. This in combination with a capacitor bank or parallel capacitor allows power reduction in a low noise fashion.

The LCU 10 sends signals to a control center 12, for example, relating to power consumption, via a communication port. These signals allow the control center 12 to diagnose the operation of the lighting system and to monitor power consumption. The modified system may include current transformers (C/T's) 14 with power monitoring capabilities. An exemplary C/T unit is Model Number Hawkeye 8036 manufactured by Veris Industries (Square D), but other C/Ts may be used. The unit includes three C/T's, and at least one of the C/T's contains power monitor circuitry for logging energy data, such as, Amperage, Voltage, power and Kwh. In alternative embodiments, the LCU 10 performs the consumption and/or fault monitoring.

Figure 3:
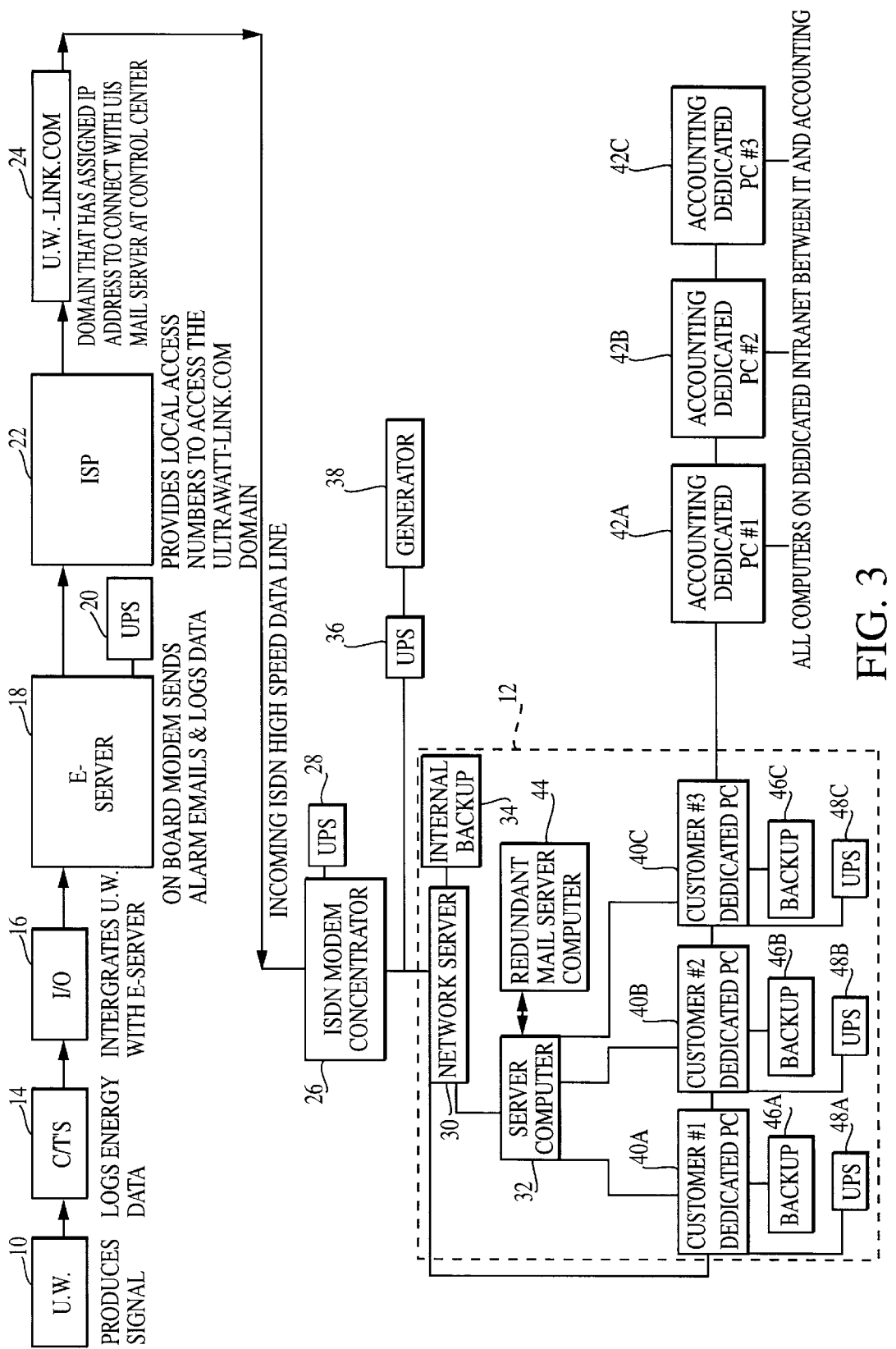
FIG. 3 is a block diagram showing one preferred embodiment of a lighting monitoring system.

Referring to FIG. 3, another preferred embodiment of the modified lighting system is shown according to the preferred embodiments. The C/T's 14 preferably connect in daisy chain fashion with an input/output (I/O) card 16. Preferably, one C/T 14 is utilized for each phase of the electrical system. An exemplary I/O card is manufactured by Veris Industries, but other I/O cards may be used. The I/O card 16 connects with the LCU's communication port. For example, the communications port is a standard 15-pin connector which is rated for nominal 5 Volt, 10 milliamp dry contact operation. Other communication ports may be used. The I/O card 16 includes a protocol platform so that a device, such as the E-server 18, may read the signals sent via the communications port of the LCU 10. Preferably, the protocol platform identifies each LCU 10 with a unique address so that an operator can determine from which LCU 10 a signal originated.

The I/O card 16 integrated at least one LCU 10 with an E-server unit 18. An exemplary E-Server unit 18 is Model Number Series H8800 manufactured by Veris Industries. Other communication devices may be used, such as personal computers, processors, or general servers. The E-Server 18 is an energy information server which contains an onboard converter, a microprocessor and a modem. The E-Server 18 preferably includes software that is configurable so that the E-Server may adapt to different lighting system configurations, but may be hard wired. The E-Server 18 logs energy information, like Kwh usage of the lighting system, and signals, like alarm signals, from the LCU 10, and automatically transfers this information, for example, via e-mail. Those skilled in the art will appreciate that the E-Server can send messages to the control center 12 using other methods such as via a telephone line with a modem, via a T1 line, or by cable.

Optionally, the E-Server 18 connects with a first uninterrupted power source (UPS) 20 for continuous operation in the case of a power failure. The UPS 20 allows operators at the control center 12 to communicate with the E-Server 18 to diagnose alarms during power failure. An internet service provider (ISP) 22 connects with the E-Server 18. The ISP 22 allows operators at the control center 12 to connect with any LCU 10. The ISP 22 also allows messages to be sent from the E-Server 18 to the control center 12 from anywhere in a region or globally. A domain name 24 is preferably set-up, for example, ULTRAWATT-LINK.com, to allow the control center 12 to receive the messages from the E-Server 18 and other E-servers.

Optionally, a concentrator 26 connects the ISP 22 with the control center 12 via an integrated services digital network (ISDN) high speed data line or other data transfer mechanism. The concentrator 26 allows multiple computers to connect with and simultaneously run from a single ISDN line. Other communication configurations may be used such as using multiple dedicated lines and modems, T1 or cable. The ISDN transmits data digitally and preferably provides two simultaneous connections over a single line. In addition, multiple devices may attach to the line in a network fashion. Typically, the ISP 22 provides the concentrator 26 which houses a high speed ISDN Modem expansion card. Preferably, the concentrator 26 connects with a second UPS 28.

The concentrator 26, ISP 22, LCU 10, C/T 14 or I/O 16 connects with a network server 30 at the control center 12. Those skilled in the art will appreciate that the concentrator 26 may also be located away from the control center 12. The network server 30 facilitates message delivery to a server processor 32, for example, a personal computer (PC), and transfers logging data between the PCs and an accounting department, described below. The network server 28 preferably connects with an internal backup 34 and a third UPS 36 with a generator 38, to safeguard against the loss and corruption of received consumption and alarm data.

The server processor 32 is located at the control center 12 and is preferably a dedicated stand alone PC with a live connection to the network server 30. The server processor 32 automatically sends alarm messages, for example, via e-mail, to at least one customer processor 40a–40c, for example, a PC. Preferably, each end user account, per facility, has a dedicated customer processor 40a–40c which performs the logging of energy information for service program fee charging purposes, as discussed above, and receiving alarm messages for the lighting system maintenance program, as discussed below. Each customer processor 40a–40c is network server 30 and connects with dedicated accounting processors 42a–42c, for example, PCs, one for each monitored facility, for ease of transferring logged alarm signals and energy consumption information. The accounting processors 42a–42c are used to determine charged fees under the service program, as discussed below. Dedicated processors or PCs are used per facility for convenience purposes, but one PC could be used for all facilities.

Preferably, all processors are interconnected by the network and have constant connection to the Internet through ISP 22 for receiving information. In addition, the server processor 32 connects with a redundant server processor 44 and the customer dedicated processors 40a–40c connect with data backups 46a–46c and UPSs 48a–48c. Non-redundant or different redundant systems may be used.

Figure 4A:
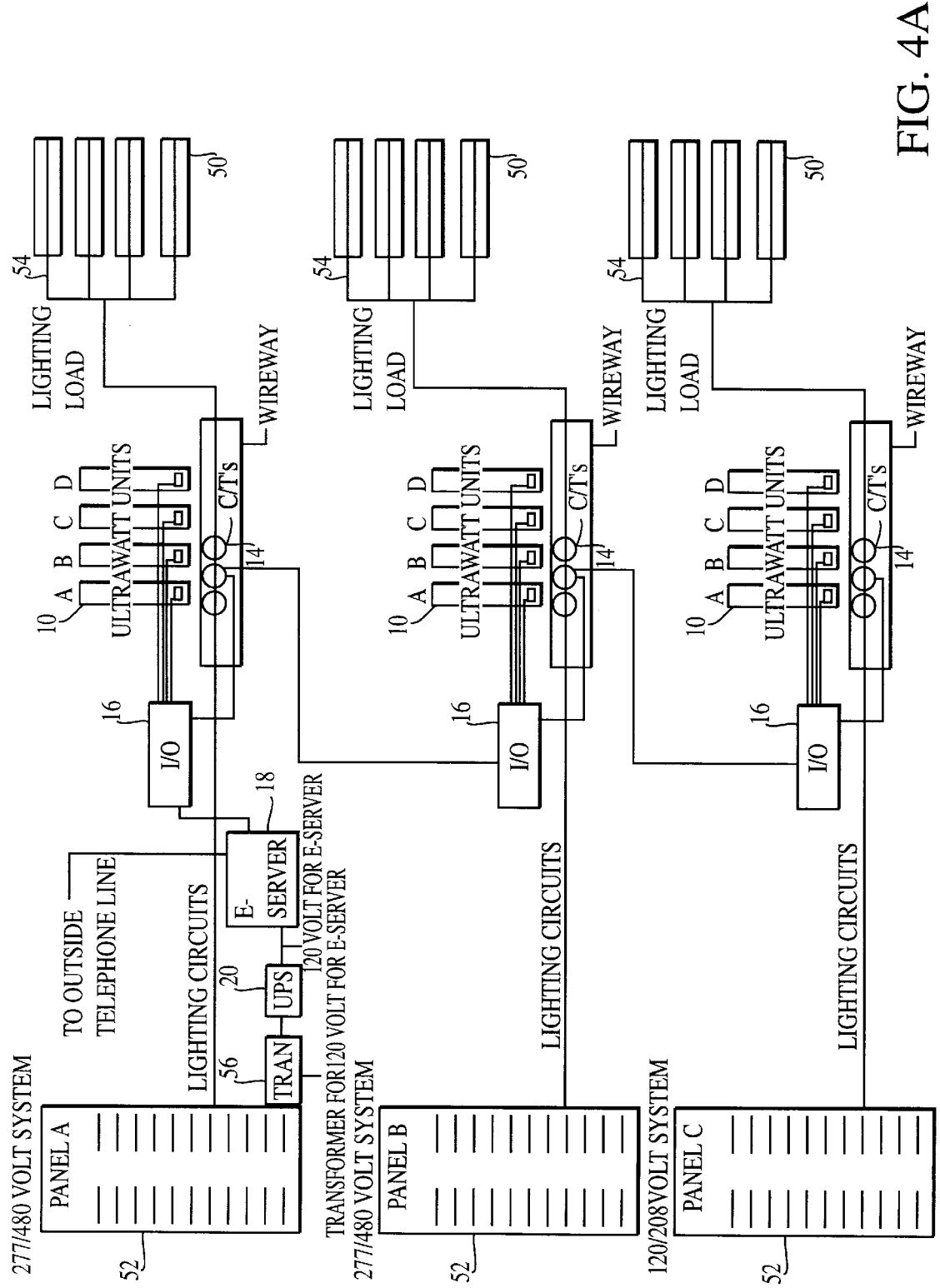
FIGS. 4A–4D are detailed wiring schematics showing one preferred embodiment for wiring the lighting monitoring system shown in FIG. 3.
Figure 4B:
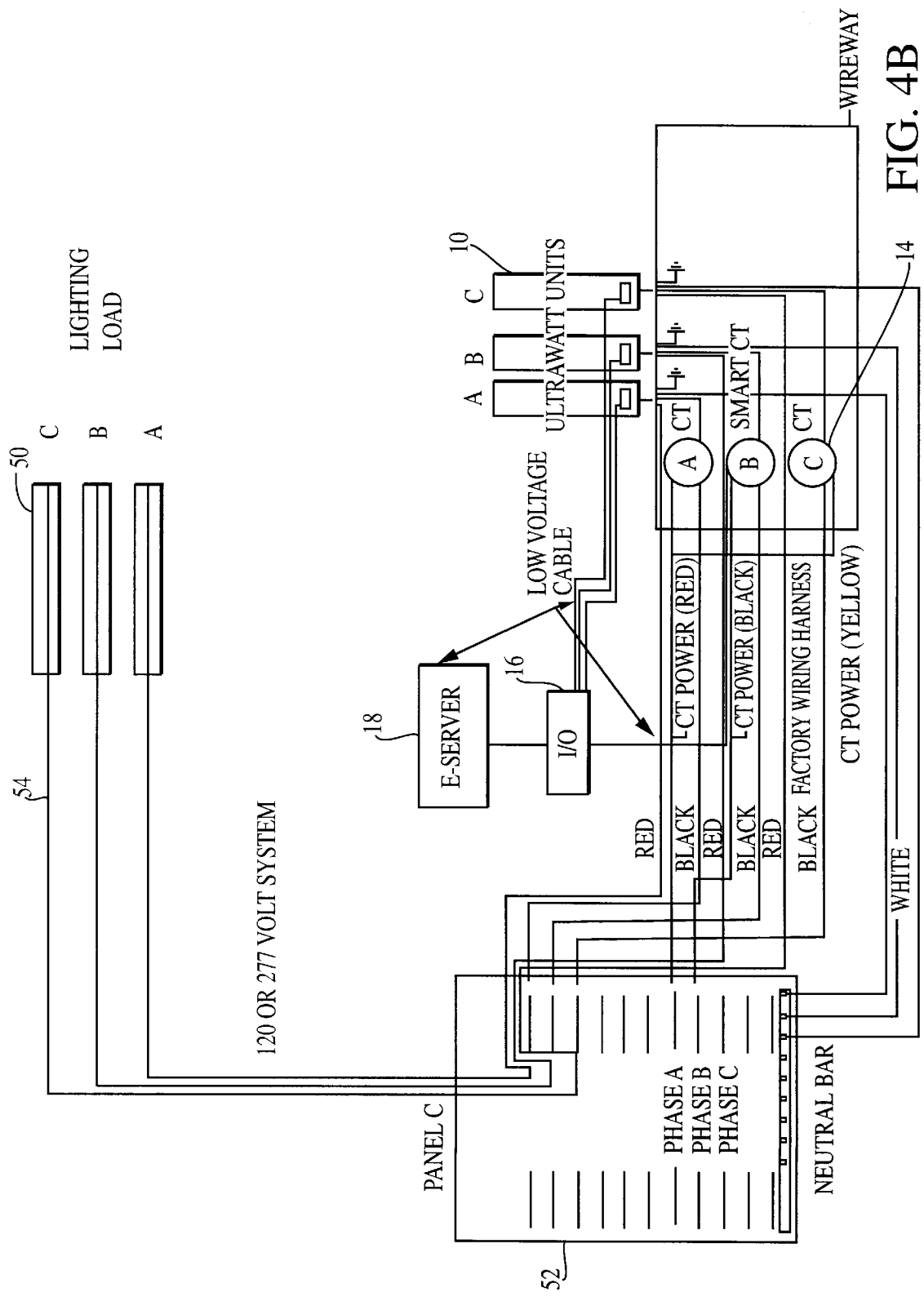
Figure 4C:
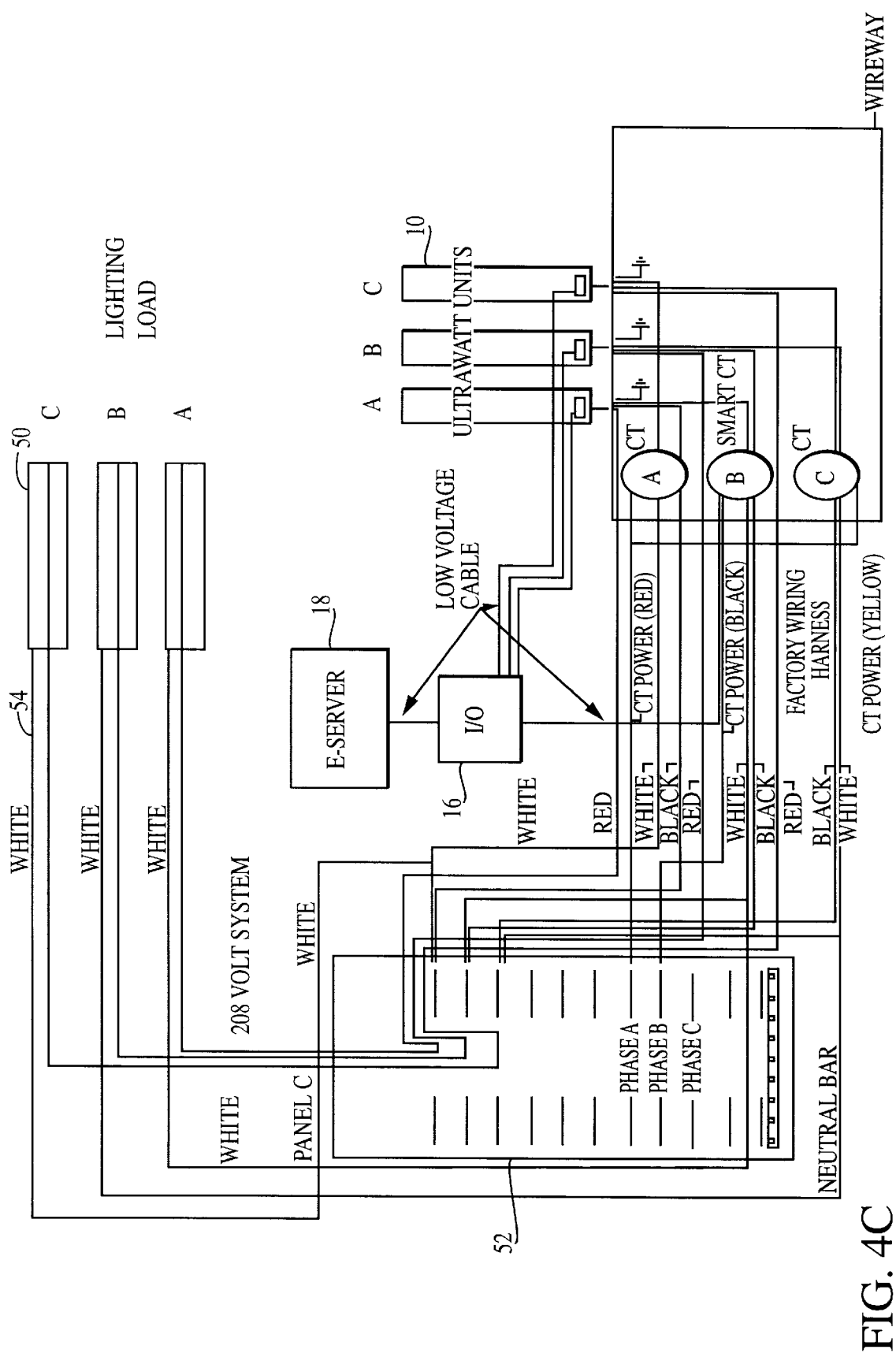
Figure 4D:
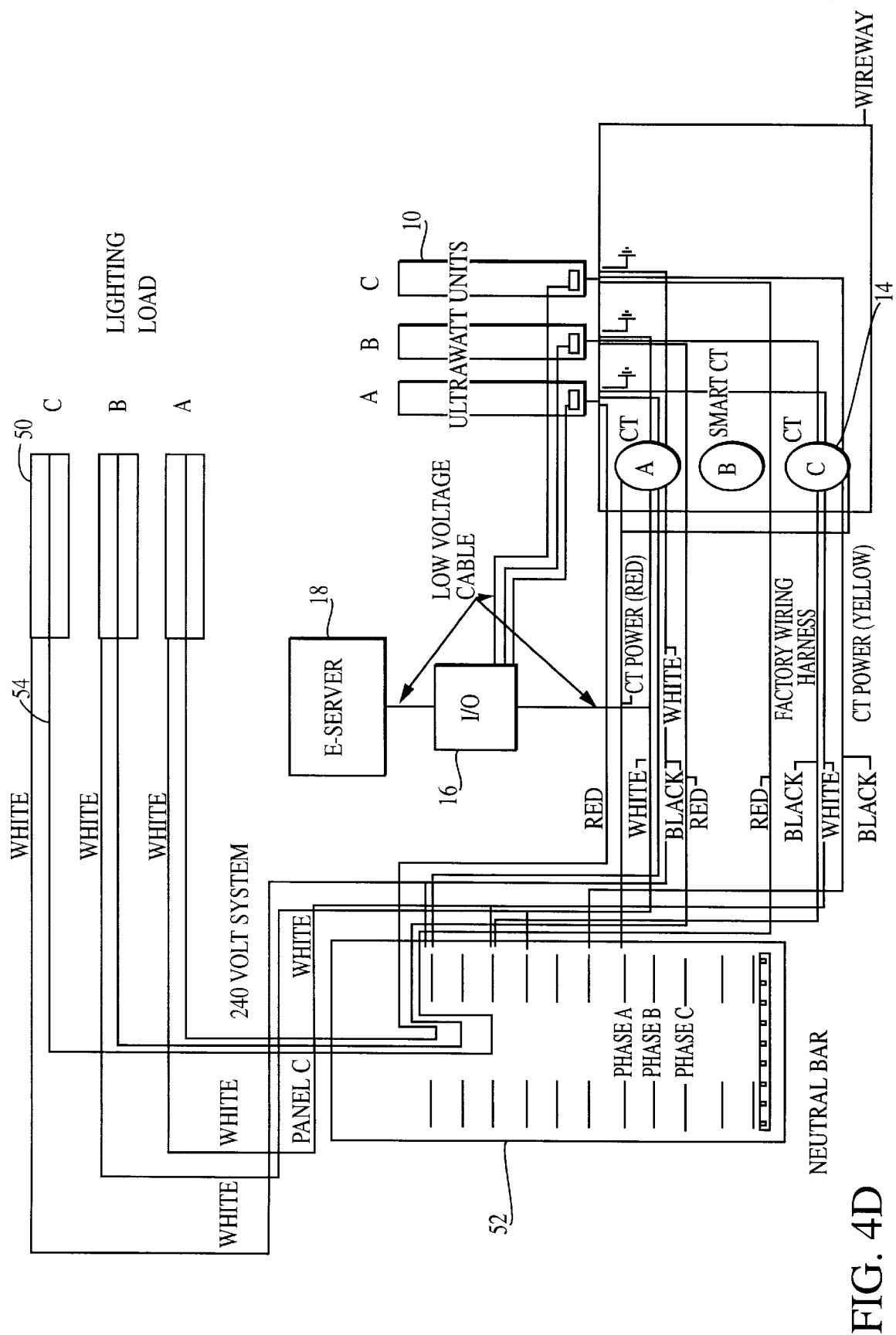

Referring now to FIGS. 4A–4D, exemplary detailed wiring schematics are shown for differing lighting monitoring systems. Other electrical systems may use the method and systems of the preferred embodiments. Referring to FIG. 4A, a 277/480 Volt system is shown. A lighting load 50, such as HID fluorescent and incandescent, of the lighting system and electrical panel 52 are shown connected with the LCU 10, the I/O 16, the C/T's 14 and the E-Server 18. The LCU 10 connects in series with the load 50. One C/T 14 is used per phase for each load 50. The C/Ts 14 preferably snap fit around a line 54 from the lighting load 50. As discussed above, the C/T 14 connects with the I/O 16 which connects with C/Ts from other panels and the E-server 18 is a daisy wheel configuration. The I/O 16 connects to the E-server 18 through a socket connector, for example, a RS-45 connector. To obtain the 120 Volts or other voltages necessary to power the E-server 18 or other component, a transformer 56 is used. Other power sources may be provided. Referring to FIG. 4B, an exemplary wiring diagram is shown for a 120/277 Volt system. Referring to FIG. 4C, a wiring diagram is shown for a 208 Volt system. Referring to FIG. 4D, a wiring diagram is shown for a 240 Volt system. Other wiring arrangements are possible for each system or other voltage systems.

Turning now to the service program of the preferred embodiments, one or more of the above-described monitoring systems or another system are used to provide power reduction and/or energy charge savings. The LCU 10 is preferably provided by at least one member of an alliance of service providers. The service providers also preferably include an Engineering Firm/Project Manager, Construction Manager/Contractor, a wholesale fixture company, and/or a lighting service company. Those skilled in the art should appreciate that that the alliance may be any combination of these providers and may include other types of providers as well. Since the LCU 10 provides for power reduction and thus costs savings to facilities, the LCU 10 is preferably used with the service program to attract potential customers, for example, owners or managers of facilities with lighting systems, i.e., end users.

The service providers use at least three basic avenues to introduce the service program to potential customers. First, the service providers market the alliance to potential customers. Through the years, alliance members have developed a customer base to sell products and services. Alliance members have numerous accounts that are dealt with on a regular basis and existing contracts with these customers. To introduce the service program to potential customers, marketing personnel of the alliance members are preferably trained to identify potential customers and present the service program to such customers. Second, the alliance preferably has an internal marketing force to introduce the service program to potential customers. The potential customers are selected as a result of leads generated by support groups that the alliance has developed or other leads. The support groups preferably have strong contacts at the highest levels of major corporations to reduce the time normally required to determine and reach the correct upper management personal at the highest levels of the potential customer's corporate structure. Third, as projects are completed, the alliance preferably requests testimonials from satisfied customers to explain their satisfaction with the results of the service program for their particular facilities. These testimonials may be in the form of videos, letters of recommendation and verbal recommendations.

Thereafter, potential customers are preferably reviewed to determine whether the customer's financial position is solid and to determine whether the customer's facilities fall within the guidelines of the service program. Alliance personnel pre-qualify the potential customer by gathering general information about the potential customer's facilities. For example, hours of operation, kilowatt hours (Kwh) rates, and existing lighting system component information is obtained. Preferably, a questionnaire provides general information about the existing lighting systems in all or a subset of the customer's facilities.

Gathered information also includes whether operating hours vary in different areas of the facility. The audit reflects the operating hours by area and whether or not the area has air conditioning. If lights are switched on/off, the switching method is verified. Switching methods include energy management system, time clock, photocell, and occupancy sensors. If some fixtures are switched by wall switches, the average hours of operation for these fixtures is noted. These fixtures may be excluded from the base program and may be included under separate negotiations with the customer. Alternatively, such fixtures are included in the program.

The type and number of fixtures and lamps, their wattage and voltage, and the type of reflectors, if any are identified. Broken and discolored lenses are noted, as is the type of bell of the fixture. The approximate age of ballasts is also recorded for use during the design phase of the project. Any obvious code violations are noted, and new lighting control equipment is considered for any lighting circuits to achieve additional energy savings.

Gathered information is then used to run a computer model, for example, to determine the financial feasibility of the project for the alliance, i.e., the margin of profit. The higher the Kwh costs, for example, greater than seven cents, and the longer the operating hours, the greater the potential for profit. In addition, particular applications, for example warehouses, distribution centers, retail, and industrial buildings have a greater potential for using high wattage lamps than residential buildings, and thus have the potential for higher energy consumption. After reviewing the feasibility of the project, including possible fixture retrofitting or replacement, the alliance either accepts or rejects the project.

Once the project is accepted, the alliance introduces the service program to the customer and the customer receives a copy of an agreement. According to the preferred embodiments, the service program directly generates at least one stream of revenue for the service providers, i.e., the alliance. The revenue is based on cost avoidance funds as determined by costs to the facility both before and after the facility is upgraded. The facility is typically upgraded with, for example, the LCU, energy efficient lamps and lighting fixtures, new ballasts, energy meters, and/or communications hardware and software. The service providers typically install the LCU and upgrade the facilities lighting system at no cost. Additional changes may be provided. Thereafter, the service providers gain a stream of revenue in at least one or two ways described below. The upgrades provide for more energy efficient facilities which in turn reduces facility energy costs and is better for the environment.

Figure 5:
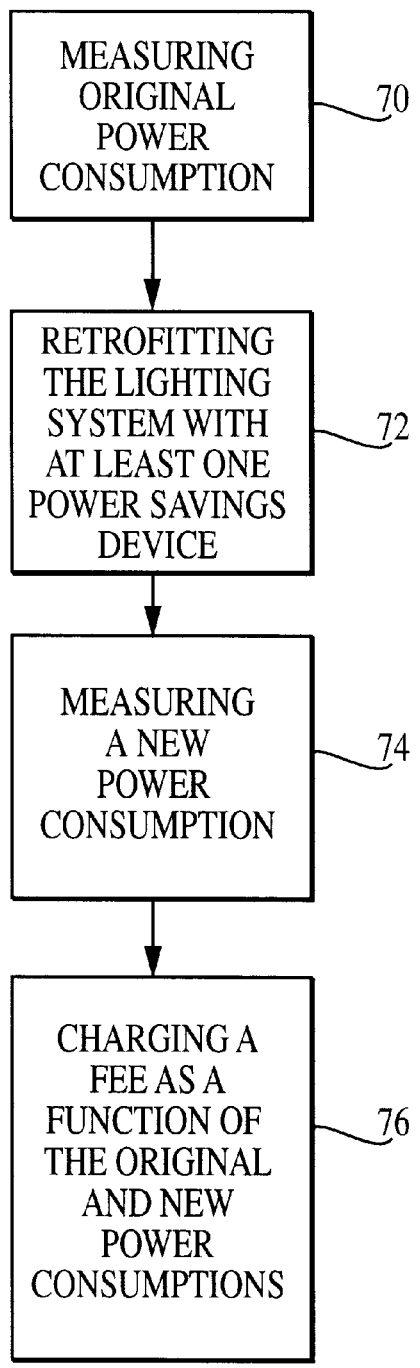
FIG. 5 is a flow chart representing one preferred embodiment on the lighting system service program.

A first source of revenue comprises a fee based on savings in energy costs. Referring FIG. 5, to determine a fee charged by the service provider, the electric utility cost for the original lighting system is determined to create a baseline figure (block 70). For example, the original power consumption may be determined using the book value of the existing fixtures, as determined within the industry. Thereafter, the lighting system is retrofitted with at least one power savings device (block 72) and optionally other electrical equipment. After the power savings device is installed, new power consumption data is measured (block 74). Finally, a fee is charged as a function of the difference between the power consumption of the original lighting system and the power consumption for the new lighting system (block 76). Preferably, the service provider maintains the lighting system at no, or a reduced, cost to the end user.

More particularly, the cost for the original lighting system is preferably determined from the Kwh usage of the original system as measured by the service provider and physically verified by the end user. Referring again to FIG. 1, exemplary lighting system costs are shown for an original lighting system, i.e., prior to operation in the power savings mode. As an example, electric utility costs are one dollar and end user maintenance costs total twenty cents; ten cents for ballast maintenance, two cents for light fixture maintenance, and eight cents for spot re-lamp.

Also referring to FIGS. 6A–6I, exemplary sheets are shown for collecting information relating to total cost figures that are determined before and after the lighting system is operating in the power savings mode. The described sheets are for example purposes only and other sheet formats may be used. Referring to FIG. 6A, an exemplary first sheet contains general information about the end user including the address of the end user's facility. Preferably, the audit is performed by an alliance member such as the Engineering Firm/Project Manager and/or Construction Manager/Contractor personnel. Referring to FIGS. 6B–6D, measurements are taken before the LCU or other power reduction equipment are installed. Using a meter, measurements are made for main panel feeders and all neutrals. All total harmonic distortion (THD) readings are taken from the Amp scale of the meter. Preferably, to allow for bum in time, new fluorescent lamps are operated for a minimum of one hour and high intensity discharge (HID) lamps are operated for a minimum of seventy two hours prior to recording any power measurements. Referring to FIGS. 6C and 6D, measurements are taken of the circuits before and after the circuits are retrofitted.

Referring to FIGS. 6E and 6F, measurements are taken after the LCU is installed and the LCU is operating in the power savings mode off. Operation in this bypass mode allows the fixtures to stabilize, preferably for fifteen to thirty minutes, and the neutral lines are verified to meet code. Referring to FIGS. 6G–6I, the LCU is switched to the savings mode and the fixtures are allowed to stabilize for about fifteen to thirty minutes. Thereafter, lighting circuit measurements are recorded at the panel for the circuits connected to the LCU units.

Light level recordings are also performed before the retrofit and LCU units are installed and after the retrofit is completed and the LCU units are installed to allow for a light level comparison. Light level readings are preferably performed using the same light meter and at the same points in the facility. Also, the readings preferably occur without interference from outside light. Pictures may be taken of the areas where the light level readings are taken. The light level before and after the lighting system is operating in the power savings mode is preferably within a certain percentage as negotiated by the end user and the service provider.

Referring again to FIG. 2, exemplary costs to the facility after utilization of the service program are shown according to a preferred embodiment. The fee is charged to the end user, such that the fee is a function of a difference between the original power consumption and the new power consumption. For example, the fee from the end user to the service company is forty cents where the original electric utility cost was one dollar (see FIG. 1) and the new electric utility cost is sixty cents. Notice that the end user has received an upgraded system with no out of pocket expenses and saves twenty cents on maintenance costs (see FIG. 1) where maintenance is provided without cost.

Alternatively, the fee is the difference between the original power consumption and the new power consumption multiplied by actual hours of operation, multiplied by a power rate, and multiplied by an air conditioning reduction factor. The hours of operation, the power rate and the air conditioning reduction factor may be determined through negotiation. Other calculations may be used to suit the specific requirements of the end user and the service provider, such as a fee comprising only a portion of the reduction.

Preferably, the direct fee is charged with a periodic billing cycle, for example, every 28 days, to allow for the same number of Saturdays and Sundays in each cycle. Instead of charging a fixed fee, the fee is preferably determined at the end of each billing cycle according to actual power consumption, the data of which is logged according to the method and system described above, for that billing period. Thus, the end user pays a fee as a function of the power savings for that particular billing period. The fee is determined automatically at the control center based on information communicated from the end user's facility. Alternatively, those skilled in the art will appreciate that a fixed fee may be used. Accordingly, careful monitoring and maintenance of the power consumption is accomplished to insure that the power saving devices continue to function properly. If power consumption increases, the service provider may dispatch maintenance personnel, and corrective measures are automatically taken, as described with regard to the lighting system maintenance described below.

The service program of the preferred embodiments may also generate an indirect stream of revenue in the form of additional products and services from the service provider. Funds normally spent on lighting costs may be redirected into equipment and services from the service providers business. In turn, the service provider's gross sales are increased.

Figure 7:
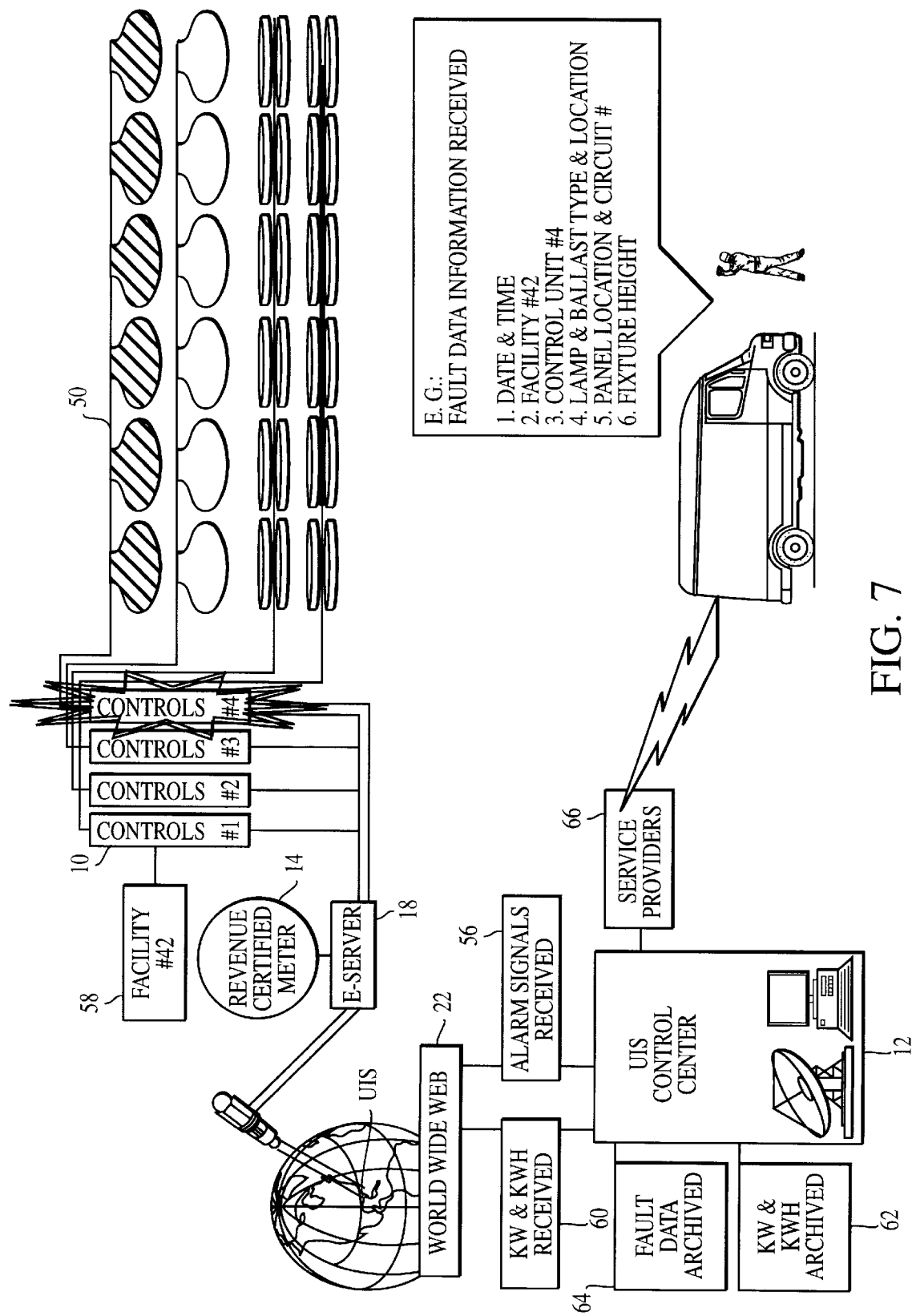
FIG. 7 is a block diagram showing one preferred embodiment of lighting system maintenance.

Referring now to lighting system maintenance as shown in FIG. 7, as stated above, the E-Server 18 sends alarm signals 56 from the LCU 10 or C/T 14 located at one or more facilities 58 to the control center 12. The information may also be communicated to other control centers of other locations. Each control center 12 may be operated by one or more of engineering, maintenance and billing companies. The alarm signals 56 are preferable sent with power consumption data 60, discussed above, via a communications device such as the Internet 22. The power consumption data 60 is logged in an energy data archive 62 and the alarm signals 56 are logged in a fault data archive 64, preferably located at the control center 12. The alarm signals may be in the form of different color lights located on the LCU 10 that preferably correspond to the operating status of the LCU 10 and include, for example, 1) the LCU is in bypass mode, i.e., not energy savings mode, 2) the LCU is not functioning, i.e., a hard fault exists in the unit, and 3) the LCU is operating in power savings mode. Those skilled in the art will appreciate that other alarm signals may be used, such as signals indicating an uncharacteristic change in consumption (e.g., reduction or increase indicating fixture, lamp or ballast malfunction).

At the control center 12, an operator diagnoses the alarm signals to determine if there is a fault. Alternatively, a computer program is run to analyze the alarm signals and display a message corresponding to the fault. If there is a fault, service personnel 66 are automatically dispatched to facility with information regarding, for example, the date and time the fault occurred, the facility's location, the LCU 10 that sent the fault data, the location and type of the lamp and ballast, the panel location and circuit number, and/or the fixture height. Additionally, in the case of the alarm, the operator may immediately call the end user to diagnose the kW, Amperage, and any other signals to determine whether or not service personnel should be dispatched. Alternative to waiting, preferably the operator informs the end user that the service provider is aware of the alarm. Other coordinating activities or a sub-set of the above-described coordinating activities may be performed.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed is:

1. A method for monitoring energy consumption of a lighting system, the method comprising:
   a) controlling power consumption of the lighting system with a lighting control unit connected with the lighting system;
   b) producing power consumption data;
   c) transferring said power consumption data via a data transfer line to a control center;
   d) receiving said power consumption data at a server located at said control center;
   e) determining a total energy usage;
   f) calculating a fee as a function of said total energy usage; and
   g) retrofitting the lighting system with a power savings device, such that said fee is calculated as a function of the difference between said total energy usage as measured before and after said power savings device is retrofitted to the lighting system.

2. The method of claim 1, wherein c) comprises transferring via electronic-mail.

3. The method of claim 1, wherein c) comprises transferring via an internet service provider.

4. The method of claim 1, wherein b) comprises producing at least one alarm signal as a function of the occurrence of a system fault, c) comprises transferring said alarm signal via a data transfer line to said control center, and d) comprises receiving said alarm signal at a server located at said control center.

5. The method of claim 4, wherein c) further comprises transferring data from said server to separate accounting processors for separate facility locations.

6. The method of claim 1, further comprising:
   performing a) through c) at a first facility location; and
   performing a) through c) at a second facility location, wherein d) comprises receiving said power consumption data at said server located at said control center for both said first facility location and said second facility location.

7. A system for monitoring energy consumption of a lighting system, the system comprising:
   a) a lighting control unit connected with the lighting system to control power consumption of the lighting system;
   b) a power meter to produce power consumption data;
   c) a data transfer line to transfer said power consumption data to a control center;
   d) at least one server located at said control center to receive said power consumption data; and
   e) a processor, such that a total energy usage is determined and said processor calculates a fee charged by a service provider to an end user as a function of the difference between said total energy usage as measured before and after a power savings device is added to the lighting system.

8. The system of claim 7, wherein c) is performed via electronic-mail.

9. The system of claim 7, wherein said lighting control unit produces at least one alarm signal as a function of the occurrence of a system fault, c) transfers said alarm signal to said control center, and d) receives said power consumption data.

10. The system of claim 7, further comprising:
   a) through c) located at a first facility location; and
   a) through c) located at a second facility location, wherein d) receives said power consumption data at said control center for both said first facility location and said second facility location.

11. The system of claim 10, furthering comprising separate accounting processors for each of said first facility location and said second facility location.

12. A method for maintaining a lighting system which includes lighting circuitry, the method comprising:
   monitoring the lighting circuitry of at least one customer;
   producing at least one alarm signal as a function of the occurrence of a system fault;
   transferring said alarm signal via a data transfer line to a control center;
   receiving said alarm signal at a server located at said control center;
   coordinating service to the lighting circuitry when said alarm signal indicates that a fault exists with the lighting system;
   determining a total energy usage of the lighting system;
   calculating a fee as a function of said total energy usage; and retrofitting the lighting system with a power savings device, such that said fee is calculated as a function of the difference between said total energy usage as measured before and after said power savings device is retrofitted to the lighting system.

13. The method of claim 12 wherein said control center is located remote from said lighting circuits.

14. The method of claim 12, further including transferring said alarm signal to said control center via electronic-mail.

15. A system for maintaining a lighting system which includes lighting circuitry, the system comprising:

at least one monitor to monitor the lighting circuitry of at least one customer and to produce at least one alarm signal as a function of the occurrence of a system fault;

a data transfer line to transfer said alarm signal line to a control center;

a server to receive said alarm signal at said control center;

at least one operator to coordinate service to the lighting circuitry when said alarm signal indicates that a fault exists with the lighting system; and a processor to determine a total energy usage of the lighting system and calculate a fee as a function of the difference between said total energy usage as measured before and after a power savings device is retrofitted to the lighting system.

16. The system of claim 15 wherein said control center is located remote from said lighting circuits.

17. The system of claim 16, wherein said alarm signal is transferred to said control center via electronic-mail.

18. The system of claim 16, wherein said alarm signal is transferred to said control center via an internet service provider.

* * * * *